United States Patent [19]

Young

[11] 4,272,132
[45] Jun. 9, 1981

[54] CONTROL MECHANISMS FOR VEHICLE BRAKING SYSTEMS

[75] Inventor: Alastair J. Young, Kenilworth, England

[73] Assignee: Automotive Products Limited, Warwickshire, England

[21] Appl. No.: 76,808

[22] Filed: Sep. 18, 1979

[30] Foreign Application Priority Data

Sep. 22, 1978 [GB] United Kingdom ............... 37761/78

[51] Int. Cl.³ ................................................ B60T 8/26
[52] U.S. Cl. .................................... 303/22 R; 188/195
[58] Field of Search ................... 303/22 R, 22 A, 6 C, 303/6 A; 188/195, 349; 180/271; 280/88; 74/469, 471, 479

[56] References Cited

U.S. PATENT DOCUMENTS 4,030,771 6/1977 Young ..................................... 280/88
4,111,494 9/1978 Young ............................... 188/195 X Primary Examiner—Douglas C. Butler
Attorney, Agent, or Firm—Kemon & Estabrook

[57] ABSTRACT

A control mechanism is provided for a vehicle braking system of the kind in which a pair of pressure modulating valves have their performance modified during vehicle cornering only so that the brake on the inboard wheel receives less pressure than the brake on the outboard wheel. The control mechanism comprises a member which has four points forming the corners of a trapezium. The first two points, which are at the ends of one of the parallel sides of the trapezium, are connected to the suspension, the third point is connected to the valves, while the fourth point is constrained from vertical movement. During normal travel the member rotates freely about the third and fourth points so that there is no input to the valves. However, in cornering the vehicle roll causes the first and second points to move differently so that the third point also tends to move so altering the performance of the valves.

3 Claims, 4 Drawing Figures

CONTROL MECHANISMS FOR VEHICLE BRAKING SYSTEMS

The invention relates to control mechanisms for use in the vehicle braking systems of the kind which includes a driver-controlled source of fluid pressure, one pressure modulating valve interposed between the source and a brake acting on a wheel which is on one side of the vehicle and another pressure modulating valve interposed between the source and a brake acting on a wheel which is on the other side of the vehicle, the control mechanism being responsive to vehicle suspension movements to modify, during cornering only, the performance of the modulating valve associated with the inboard of said wheels so that any pressure supplied to the brake which acts on said inboard wheel is lower than any pressure supplied to the brake which acts on the outboard of said wheels.

Vehicle braking systems of the kind referred to which incorporate differential lever mechanisms have been described in U.S. Pat. Nos. 4,030,771 and 4,111,494. Whilst the mechanisms previously proposed function adequately they do not always lend themselves to easy installation in some vehicles.

The present invention provides a control mechanism for use in a vehicle braking system of the kind referred to and which comprises a member having four connecting points which are normally in a common plane and are arranged at the corners of a trapezium, the member being adapted to be connected at the first point which is at one end of one of the parallel sides of the trapezium to a vehicle suspension component which during vehicle cornering moves with vertical movement of one of said wheels relative to the vehicle body, at the second point which is at the other end of said one side of the trapezium to a vehicle suspension component which during vehicle cornering moves with vertical movement of the other of said wheels relative to the vehicle body and at the third point to the valves, the fourth point being restrained in direction substantially perpendicular to the common plane, the arrangement being such that for vertical movements of said wheels relative to vehicle body which are equal and in the same direction the member pivots freely about the third and fourth points but for vertical movements of said wheels relative to the vehicle body which are unequal or in different directions the member tends to pivot on a line passing diagonally through the fourth point.

The connection for the valves at the third point tends to move in a direction which is substantially perpendicular to the common plane during vehicle roll. If the valves are arranged as described in my co-pending U.S. Patent Appln. Ser. No. 16,380 filed Mar. 1, 1979 to the same assignee and hereby incorporated by reference the control mechanism is arranged so that the third point moves through a distance proportional to the difference in vertical movement of said wheels relative to the vehicle body and in a direction appropriate to the direction of cornering. Alternatively, if the valves are arranged as described in U.S. Pat. No. 4,140,201 hereby incorporated by reference then the control mechanism is arranged so that third point exerts a force which is proportional to the difference in vertical movement of said wheels relative to the vehicle body and in a direction appropriate to the direction of cornering.

The invention and other aspects thereof will now be described by way of example and with reference to the accompanying drawings, of which;

Figure 1:
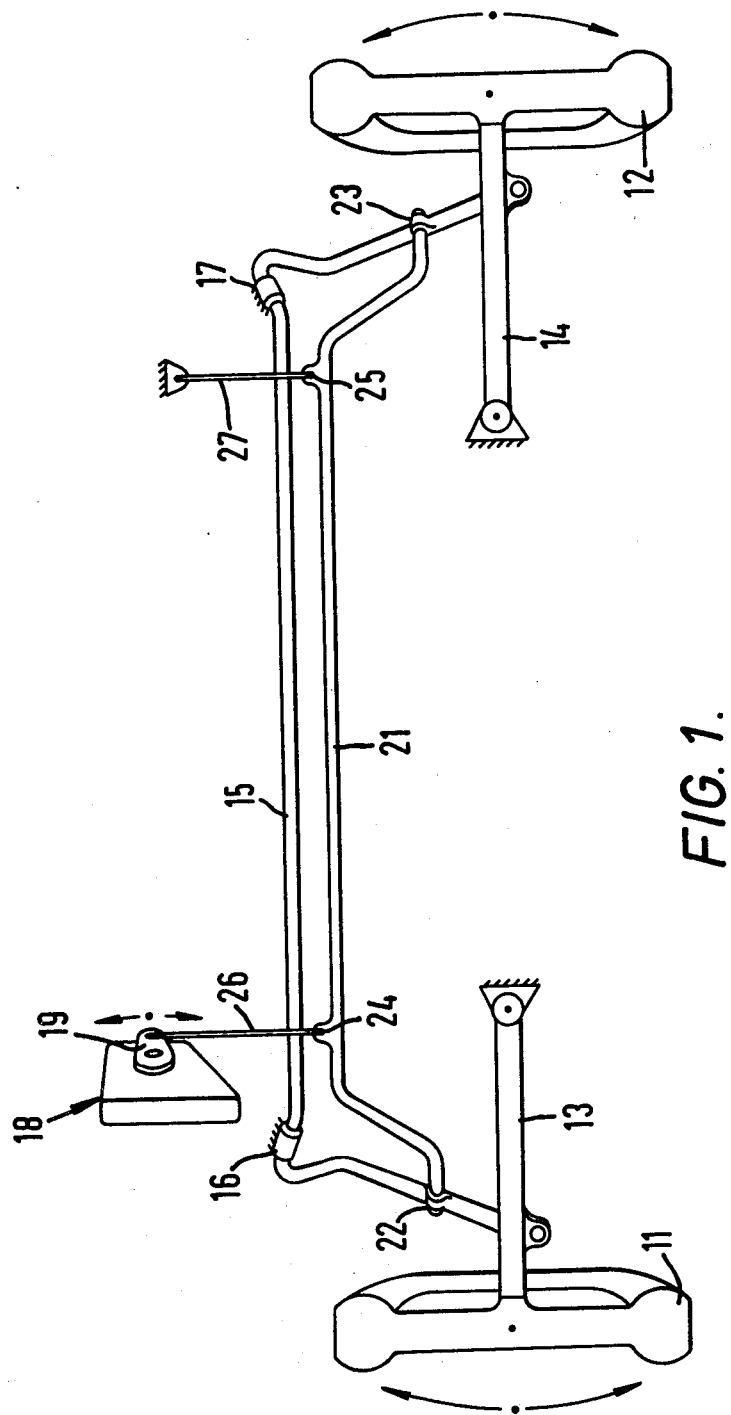
FIG. 1 is a diagrammatic perspective view of one embodiment of a control mechanism according to the invention.

Referring to the drawings and FIG. 1 in particular, there is shown part of a motor vehicle suspension including the front wheels 11 and 12, lower suspension arms 13 and 14 and an anti-roll bar 15. The suspension is shown diagrammatically as a swing axle type but for most applications the arms 13 and 14 would be the track radius arms of a Mc Pherson Strut type of suspension or the lower or upper arms of a double wishbone type. The anti-roll bar 15 is pivoted to the vehicle body at 16 and 17.

The brakes of the front wheels 11 and 12 are controlled by a pair of modulating valves controlled by a control mechanism which includes a lever mechanism as described in my co-pending U.S. Patent Application Ser. No. 16,380 referred to above. This lever mechanism is shown at 18 and in more detail in FIGS. 2 to 4. This includes a lever 19 whose angular movement from a mean position controls the extent to which braking to the wheel 11 or 12 which is on the inside of a corner can be reduced.

The control mechanism for the valves also includes a member in the form of a bar 21 bent to the form of a shallow U and which has four connection points 22, 23, 24 and 25 arranged as the corners of a trapezium and which normally lie in a common plane. The bar 21 is connected at the first connecting point 22 to the arm of the anti-roll bar 15 which is connected to suspension arm 13 and at the second connecting point 23 to the arm of the anti-roll bar 15 which is connected to the other suspension arm 14. The connections are made by spherical type joints.

At the third point 24 the bar 21 is connected by a link 26 to the lever 19 whilst at the fourth point 25 another link 27 connected to the vehicle body prevents movement of the fourth point 25 in a direction substantially perpendicular to the common plane in which lie the points 22, 23, 24 and 25.

Figure 2:
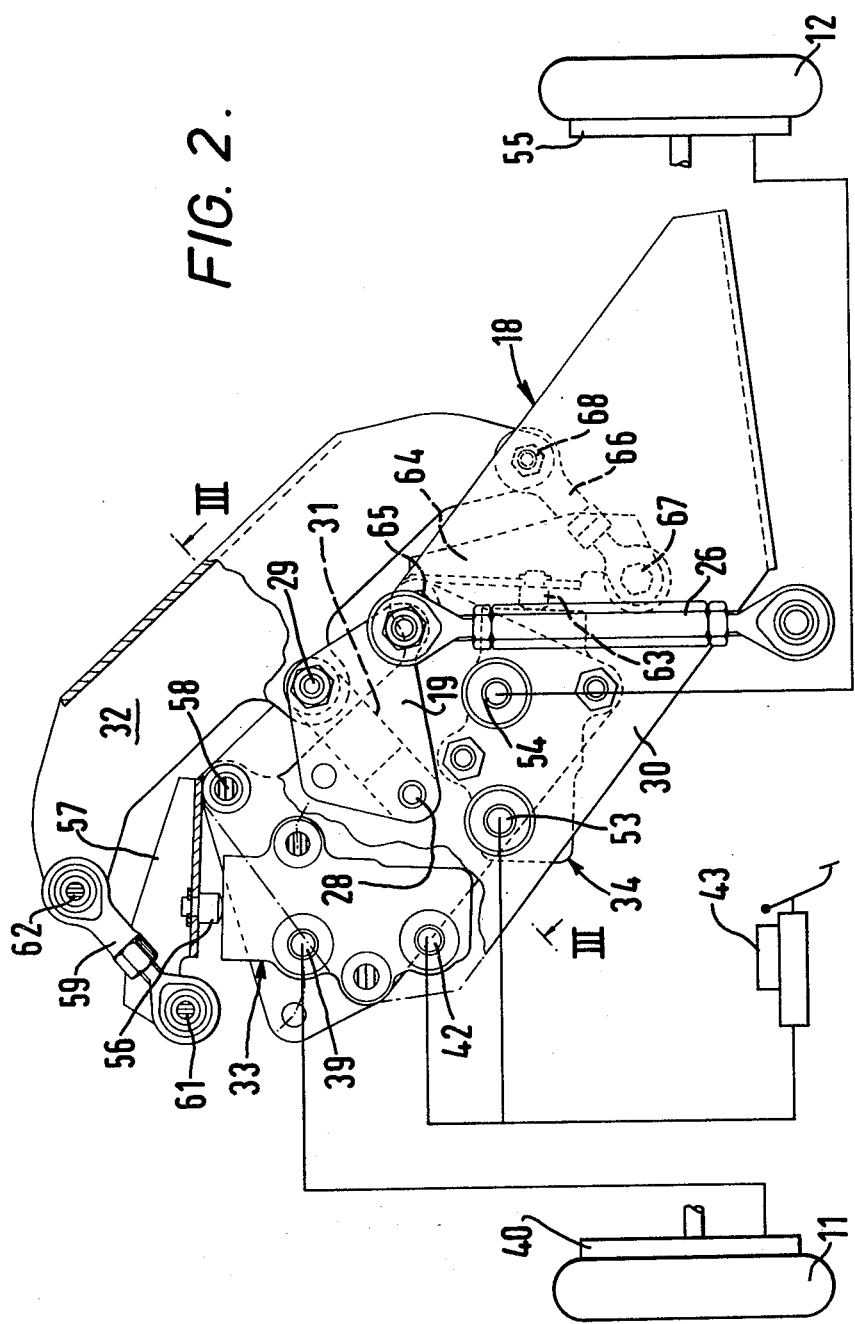
FIG. 2 is an elevation showing further details of certain parts shown in FIG. 1.
Figure 3:
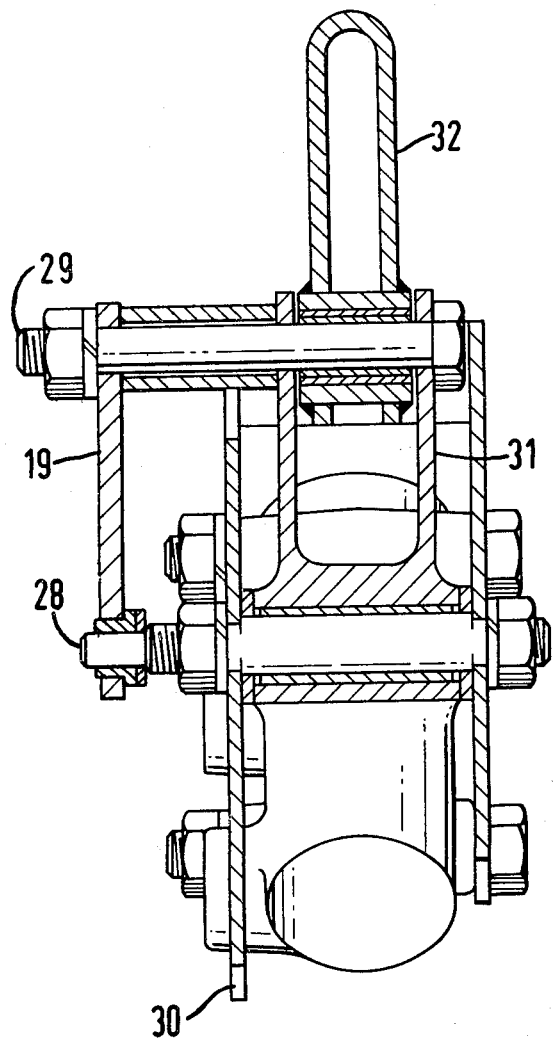
FIG. 3 is a cross-section on the line III—III in FIG. 2.
Figure 4:
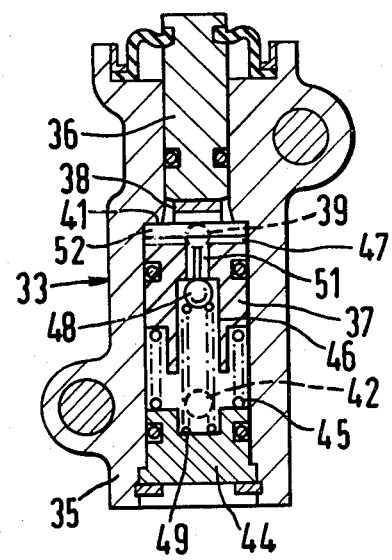
FIG. 4 is a cross-sectional elevation of a valve device shown in FIGS. 2 and 3.

FIGS. 2 and 3 show that lever 19 pivots on an extension of a pivot bolt or pin 28 which is secured to a frame 30 attached to the vehicle body. Lever 19 is connected through a sleeved extension of another pivot bolt or pin 29 to a reaction link 31.

Pivot bolt 29 acts as the central pivot of a beam 32 which serves to balance the loads reacted by the plungers of a pair of valve devices 33 and 34. Valve device 33 is shown in detail in FIG. 4, valve device 34 being identical. It comprises a housing 35 having a stepped axial through bore. A small diameter plunger 36 is slidable in the small diameter bore portion and projects a small distance from the upper end of the bore. A large diameter plunger 37 is slidable in the large diameter bore portion and has a small axially projecting nose 38 for abutment with the adjacent end of the small diameter plunger 36.

An outlet port 39 is connected to a brake 40 (FIG. 2) for wheel 11 and opens into the stepped bore at the step 41 between the large diameter portion and the small diameter portion. An inlet port 42 is connected to a driver-controlled source in the form of a master cylinder 43 of conventional construction and opens into the larger diameter bore portion between the large diameter plunger and an end plug 44. A light compression spring 45 biases the large diameter plunger 37 towards the small diameter plunger 36.

Communication between the inlet port 42 and the outlet port 39 is provided by stepped axial passage 46 in the large diameter plunger 37 and an intersecting diametral passage 47 whose axis coincides approximately with the shoulder between the main body of the plunger 37 and the nose 38.

A non-return valve is provided in the axial passage 46 by a ball 48 which can seat on the step between the large and small diameter portions of the passage 46 and which is biased in the seating direction by another light compression spring 49. However, in the position shown in FIG. 4 the ball 48 is prevented from seating by an axial pin 51 in the small diameter portion of the passage 46. This pin abuts a transverse pin 52 in the diametral passage 47 and which in turn abuts the step 41. Pin 51 is fluted to allow flow through the passage 46 when the ball 48 is not seated.

Although the second valve device 34 is identical to the first valve device it will be convenient to identify separately the inlet port 53, which is also connected to the master cyliner 43 and which corresponds to inlet port 42 and the outer port 54, which is connected to a brake 55 for wheel 12 and which corresponds to outlet port 39.

Both valve devices 33 and 34 are bolted to the frame 30. The small diameter plunger 36 of valve device 33 acts on beam 32 through a button 56 on a lever 57 which is pivoted to the frame 30 by a pin 58. A control link 59, pivoted at its ends by pins 61 and 62, joins lever 57 to the beam 32. Similarly, the corresponding small diameter plunger of valve device 34 acts on beam 32 through a button 63 on another lever 64 which is pivoted to the frame 30 by a pin 65. Another control link 66, pivoted at its ends by pins 67 and 68 joins lever 64 to the beam 32.

When the vehicle brakes in a straight line or has its static load changed, the front wheels 11 and 12 move vertically relative to the vehicle body by the same amount and in the same direction so that the bar 21 pivots freely about the third and fourth points 24 and 25. However, if the vehicle corners and, for example, wheel 11 moves upwards relative to the vehicle body as a result of increased loading and wheel 12 moves downwards as a result of decreased loading, then the first point 22 moves upwards relative to the vehicle body and the second point 23 moves downwards so that the bar 21 pivots about a diagonal line passing through the fourth point 25. For a symmetrical arrangement as shown and with equal and opposite vertical movements of the wheels, this line passes through the mid-point of the line joining the first and second points 22 and 23.

The lever mechanism 18 is set so that when the vehicle is static the links 31, 59 and 66 are perpendicular to a line 8 intersecting the axis of pins 62 and 68. This is aided by a hole 69 in lever 19 which aligns with a corresponding hole in the frame 30. When the vehicle brakes in a straight line there is no change in the angle of lever 19. The forces generated on button 56 by fluid pressure in valve device 33 are balanced by equal forces generated on button 63 by fluid pressure in valve device 34, the beam 32, levers 57 and 64 and links 59 and 66 providing a 1 to 1 lever ratio.

When the vehicle corners the link 26 moves as described above and alters the angle of lever 19, this has the effect of rotating the links 3, 59 and 66 and gives link 59 a different angular relationship with lever 57 to that which link 66 has with lever 64. The result is that the effective lever ratio changes so that a force on one button 56 or 63 reacts a different force on the other button 63 or 56. This force difference is compensated by movement of the plungers in the valve devices 33 and 34 which causes a reduction in the brake pressure supplied to the brake on the wheel 11 or 12 which carries the lighter load as a result of the cornering.

The control system shown in the drawing is also suitable for valves arranged as described in U.S. Pat. No. 4,140,201, referred to above, where it is necessary to provide a force which is proportional to the difference in vertical movement of the wheels relative to the vehicle body and in a direction appropriate to the direction of cornering. Movement of link 26 will then be resisted by the valves so that the bar 21 will tend to twist during cornering to provide the biassing loads necessary for this arrangement of valves. Additional or alternative resilience can be provided by making either or both of links 26 with spring which provide compressive and tensile deflection or by making similar spring connections to the suspension at points 22 and 23.

I claim:
1. In a motor vehicle including:
one wheel on one side of the vehicle;
another wheel on the other side of the vehicle;
one suspension component which during vehicle cornering moves with vertical movement relative to the vehicle body of said one wheel;
another suspension component which during vehicle cornering moves with vertical movement relative to the vehicle body of said other wheel; and
a braking system comprising:
a driver-controlled source of fluid pressure;
one brake operative to brake said one wheel;
another brake operative to brake said other wheel;
one pressure modulating valve interposed between said source and said one brake;
another pressure modulating valve interposed between said source and said other brake;
a control mechanism for controlling said pressure modulating valves in response to movements of said suspension components to modify, during cornering only, the performance of the modulating valve associated with the inboard of said wheels so that any pressure supplied to the brake which acts on said inboard wheel is lower than any pressure suppled to the brake which acts on the outboard of said wheels;
the control mechanism comprising:
a member having four connecting points which are normally in a common plane and are arranged at the corners of a trapezium;
the member being adapted to be connected at the first point to said one suspension component;
at the second point to said other suspension component and at the third point to the modulating valves;
the fourth point being restrained in a direction substantially perpendicular to the common plane, the arrangement being such that for vertical move- ments of said wheels relative to the vehicle body which are equal and in the same direction;
the member pivots freely about the third and fourth points and for movements of said wheels relative to the vehicle body which are unequal and for movements of said wheels relative to the vehicle body which are in different directions the member tends to pivot on a line passing diagonally through the fourth point.

2. The control mechanism of claim 1, wherein the member comprises a bar bent to the form of a shallow U.

3. The control mechanism of claim 2, wherein said first and second points are adjacent to respective ends of the bar.

* * * * *